H. E. TREDUP.
AUTO WHEEL.
APPLICATION FILED JAN. 26, 1918. RENEWED DEC. 16, 1918.
1,297,275.
Patented Mar. 11, 1919.
2 SHEETS—SHEET 1.
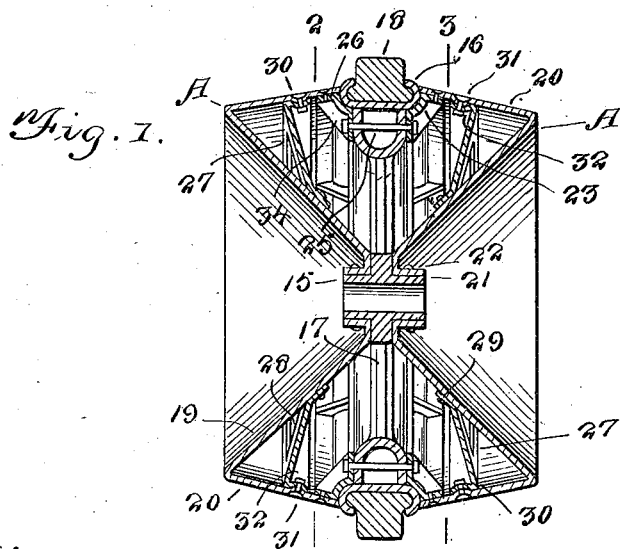
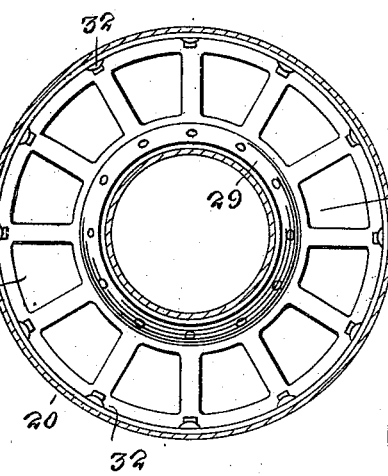
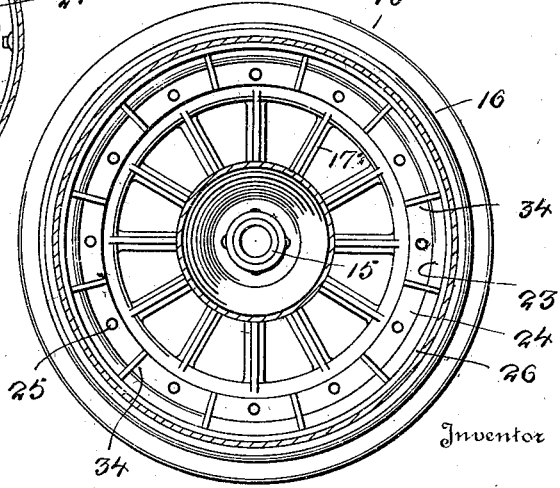
Witnesses
E. R. Ruppert.
Dorothy Lainhart
Inventor
H. E. Tredup
By Victor J. Evans
Attorney

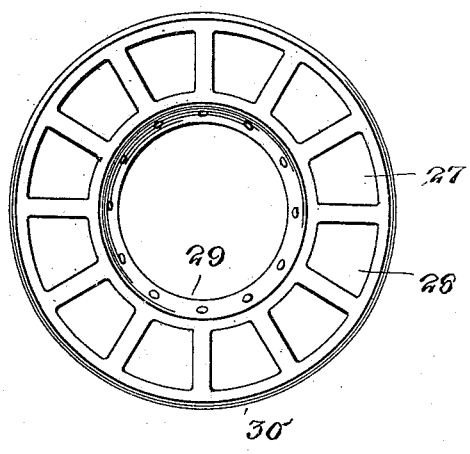
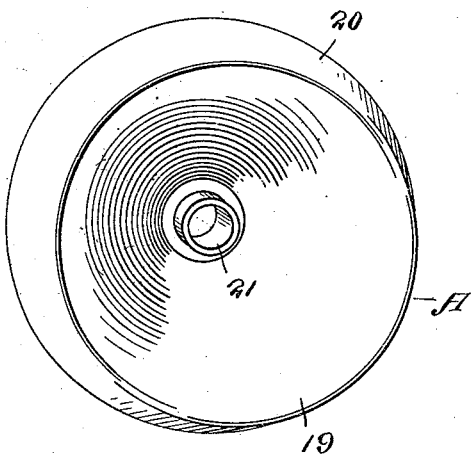
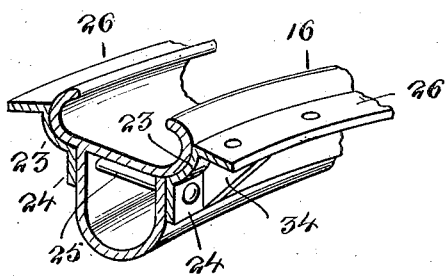

UNITED STATES PATENT OFFICE.

HERMAN EDWARD TREDUP, OF SEBEWAING, MICHIGAN.

AUTO-WHEEL.

1,297,275.   Specification of Letters Patent.   Patented Mar. 11, 1919.

Application filed January 26, 1918, Serial No. 213,987. Renewed December 16, 1918. Serial No. 267,016.

*To all whom it may concern:*

Be it known that I, HERMAN E. TREDUP, a citizen of the United States, residing at Sebewaing, in the county of Huron and State of Michigan, have invented new and useful Improvements in Auto-Wheels, of which the following is a specification.

This invention relates to wheels for automobiles and motor vehicles and it has particular reference to wheels for heavy trucks, armored cars and the like which, owing to their weight, are liable to have their progress impeded when traveling over soft, boggy, marshy or sandy territory.

The invention has for its object to produce a wheel of simple and improved construction which will be provided with extensions producing an extremely broad tread and which will be so constructed as to prevent sinking in soft or sandy soil and which when the soil is wet and clayey will tend to shed the dirt instead of letting it adhere as is the case with wheels of ordinary construction.

A further object of the invention is to produce a wheel embodying in its construction an ordinary hub, rim, spokes and tire together with extension members whereby the improved tread is produced and means for bracing and assembling the parts.

A further object of the invention is to simplify and improve the construction and assemblage of the parts entering into the construction of the improved wheel.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings:

Figure 1 is a vertical sectional view of a wheel constructed in accordance with the invention taken longitudinally of the axis thereof.

Fig. 2 is a vertical sectional view taken on the line 2—2 in Fig. 1.

Fig. 3 is a vertical sectional view taken on the line 3—3 in Fig. 1.

Fig. 4 is a view in side elevation of one of the annular brace members.

Fig. 5 is a perspective view of one of the extension members or tread members, detached.

Fig. 6 is a perspective detail view of a portion of the rim of the wheel showing supporting means for the tread members connected therewith.

Corresponding parts in the several figures are denoted by like characters of reference.

In the construction of the improved device an ordinary automobile wheel may be employed, the same including the hub 15, rim 16, spokes 17 and tire 18, the latter having been shown as consisting of a solid rubber tire although within the scope of the invention any well known form of tire may be used. It will also be understood that in view of a wheel having spokes, solid disks of modern construction may be employed. The improved attachment comprises a pair of extension members A each consisting of a cup-shaped or funnel-shaped disk 19 having a circumferential flange 20 which tapers from the edge of the disk in an outward direction so that the diameter of the edge portion of the flange 20 will materially exceed the diameter of the disk 19 at the edge thereof. The disk 19 has a central aperture 21 surrounded by a flange 22 adapted to fit snugly upon the hub 15 of the wheel in connection with which the device is to be used.

Securely bolted upon or otherwise connected with the wheel adjacent to the rim and on each side face thereof is an annular band 23 of angular shape embodying a wing 24 for the passage of the bolts 25 whereby the bands are secured on the wheel and an outwardly extending wing 26 on which the flange 20 of the disk 19 will be snugly fitted, said wing 26 being formed in such a way as to correspond with the taper of the flange 20. One of the disks A is fitted on each side of the wheel and secured in position by fastening means such as machine bolts or screws engaging the wing 26 and the hub 15 through apertures in the flanges 20 and 22 respectively. It is obvious that any fastening means of well known construction may be employed whereby the parts of the device will be securely assembled in such a manner that there will be no possibility of sand, dirt and the like working through the joints into the inner space intermediate the spokes, the disks 19 and the flanges 20.

Each of the extension members of the tread members is provided with an interiorly disposed annular brace 27, stamped or formed of sheet metal and preferably having radial slots 28 formed therein for the purpose of lightening the same without materially decreasing the strength thereof. The annular brace members are provided with the flanges 29 which are riveted or otherwise secured on the disks 19 and with the flanges 30 which are riveted or otherwise secured on the flanges 20, the said flanges 20 and 30 being provided with interengaging countersinks 31, 32 the form of which will accommodate the head of the bolt, rivet or other connecting member 33 so that the flange 20 will exteriorly present a smooth surface.

It may be stated that the extension members or tread members as well as the annular brace members 27 may be stamped or otherwise formed of sheet steel or other material possessing the necessary requisites of strength and durability without excessive weight. The parts, when constructed and assembled as herein described, will present a wheel having the tire 18 which functions with the roads when they are in good condition. The flanges 20 of the tread members will diverge upwardly with respect to the road engaging portion of the tire 18 to such an extent that they will not ordinarily come in contact with loose stones, and other obstructions on the road surface. When the territory traversed is muddy, boggy, sandy or otherwise of a yielding nature to such an extent that the tire 18 will sink therein, the flanges 20 of the tread member come into play, said flanges presenting a tread surface of such width that bogging or miring of the vehicle equipped with the improved wheel will ordinarily be prevented. The peculiar shape and construction of the tread members is also of such a nature that dirt of a clayey and sticky nature will ordinarily be shed without adhering thereto.

In order to increase the strength and durability of the device it is preferred that the annular bands 23 which serve for the attachment of the tread members to the wheel be provided with webs or braces 34 whereby the wings 24 and 26 are connected together, as clearly indicated in Fig. 1 of the drawings.

What is claimed as new is:

1. A wheel for automobiles and the like, comprising a hub, rim, spokes and tire, in combination with extension members or tread members mounted on opposite sides thereof each of said tread members comprising a funnel-shape disk having an outwardly tapered flange and a central aperture surrounded by a flange, the latter fitting on the hub of the wheel and the first-mentioned flange being supported adjacent to the rim thereof.

2. A tread attachment for automobile wheels, comprising a funnel-shaped disk having an outwardly tapered flange, said disk having a central aperture surrounded by a flange.

3. A tread attachment for automobile wheels, comprising a funnel-shaped disk having an outwardly tapered flange, said disk having a central aperture surrounded by a flange; in combination with an annular brace member having flanges secured respectively on the disk and on the outwardly tapered flange thereof.

4. A tread attachment for automobile wheels, comprising a funnel-shaped disk having an outwardly tapered flange, said disk having a central aperture surrounded by a flange; in combination with an annular brace member having flanges secured respectively on the disk and on the outwardly tapered flange thereof, said annular brace member being provided with radial slots.

5. The combination with an automobile wheel having a hub, rim, spokes and tire, of annular bands secured on opposite faces of the wheel adjacent to the rim, each of said bands being of angular shape and including an outwardly tapered wing, in combination with tread members each comprising a funnel-shaped disk having an outwardly tapered flange and a central aperture surrounded by a flange, and means whereby the last-mentioned flange is secured on the hub of the wheel and other means whereby the first-mentioned outwardly tapered flange is secured on the outwardly tapered wing of the annular band connected with the wheel.

6. The combination with an automobile wheel having a hub, rim, spokes and tire, of annular bands secured on opposite faces of the wheel adjacent to the rim, each of said bands being of angular shape and including an outwardly tapered wing, in combination with tread members each comprising a funnel-shaped disk having an outwardly tapered flange and a central aperture surrounded by a flange, and means whereby the last-mentioned flange is secured on the hub of the wheel and other means whereby the first-mentioned outwardly tapered flange is secured on the outwardly tapered wing of the annular band connected with the wheel, said tread member being provided with an interiorly disposed annular brace member.

7. The combination with an automobile wheel having a hub, rim, spokes and tire, of tread members mounted on opposite sides thereof, each of said tread members including a cupped disk secured on the hub and having a circumferential flange supported and secured adjacent to the rim of the wheel, the flanges of the respective tread members being beveled upwardly with respect to the road engaging portion of the tire.

In testimony whereof I affix my signature.

HERMAN EDWARD TREDUP.